United States Patent
Ullman et al.

(10) Patent No.: US 6,330,595 B1
(45) Date of Patent: Dec. 11, 2001

(54) ENHANCED VIDEO PROGRAMMING SYSTEM AND METHOD FOR INCORPORATING AND DISPLAYING RETRIEVED INTEGRATED INTERNET INFORMATION SEGMENTS

(75) Inventors: Craig Ullman, Brooklyn; Jack D. Hidary; Nova T. Spivack, both of New York, all of NY (US)

(73) Assignee: ACTV, Inc., New York, NY (US)

( * ) Notice: Subject to any disclaimer, the term of this patent is extended or adjusted under 35 U.S.C. 154(b) by 0 days.

(21) Appl. No.: 09/633,348

(22) Filed: Aug. 4, 2000

Related U.S. Application Data

(63) Continuation of application No. 09/472,385, filed on Dec. 23, 1999, which is a continuation of application No. 09/109,945, filed on Jul. 6, 1998, now Pat. No. 6,018,768, which is a continuation-in-part of application No. 08/615,143, filed on Mar. 14, 1996, now Pat. No. 5,778,181, which is a continuation-in-part of application No. 08/613,144, filed on Mar. 8, 1996, now abandoned.

(51) Int. Cl.$^7$ ..................................................... G06F 13/00
(52) U.S. Cl. ........................................... 709/219; 709/329
(58) Field of Search ................................... 709/203, 217, 709/219, 223, 224, 227, 231, 328, 329; 348/7, 8, 10, 12, 13, 906; 455/3.1, 5.1, 6.1

(56) References Cited

U.S. PATENT DOCUMENTS

| | | |
|---|---|---|
| 4,734,764 | 3/1988 | Pocock et al. . |
| 4,894,789 | 1/1990 | Yee . |
| 4,905,094 | 2/1990 | Pocock et al. . |
| 4,941,040 | 7/1990 | Pocock et al. . |
| 5,014,125 | 5/1991 | Pocock et al. ........................... 348/7 |
| 5,128,752 | 7/1992 | Von Kohorn . |
| 5,140,419 | 8/1992 | Galumbeck et al. . |

FOREIGN PATENT DOCUMENTS

| | | |
|---|---|---|
| 19545882 | 6/1997 | (DE) . |
| 0 757 485 | 2/1997 | (EP) . |
| 0 982 943 | 5/2000 | (EP) . |
| WO 9413107 | 6/1994 | (WO) . |
| WO 96/07270 | 3/1996 | (WO) . |
| WO 96/13124 | 5/1996 | (WO) . |
| WO 97/27546 | 7/1996 | (WO) . |
| WO 9702699 | 1/1997 | (WO) . |

OTHER PUBLICATIONS

"Web TV over Digital Cable," Dake Cripps; May 4, 1998; http://web–star.com/hdtvnews/webtvoverdigitalcable.html; pp. 1–4.

(List continued on next page.)

*Primary Examiner*—Viet D. Vu
(74) *Attorney, Agent, or Firm*—Dorsey & Whitney LLP

(57) ABSTRACT

A system for integrating video programming with the vast information resources of the Internet. A computer-based system receives a video program with embedded uniform resource locators (URLs). The URLs, the effective addresses of locations or Web sites on the Internet, are interpreted by the system and direct the system to the Web site locations to retrieve related Web pages. Upon receipt of the Web pages by the system, the Web pages are synchronized to the video content for display. The video program signal can be displayed on a video window on a conventional personal computer screen. The actual retrieved Web pages are time stamped to also be displayed, on another portion of the display screen, when predetermined related video content is displayed in the video window. As an alternative, the computer-based system receives the URLs directly through an Internet connection, at times specified by TV broadcasters in advance. The system interprets the URLs and retrieves the appropriate Web pages. The Web pages are synchronized to the video content for display in conjunction with a television program being broadcast to the user at that time. This alternative system allows the URLs to be entered for live transmission to the user.

9 Claims, 7 Drawing Sheets

U.S. PATENT DOCUMENTS

| | | |
|---|---|---|
| 5,191,410 | 3/1993 | McCalley et al. . |
| 5,262,860 | 11/1993 | Fitzpatrick et al. . |
| 5,264,933 | 11/1993 | Rosser et al. . |
| 5,285,278 | 2/1994 | Holman . |
| 5,353,283 | 10/1994 | Tsuchiya ............................. 370/392 |
| 5,438,355 | 8/1995 | Palmer . |
| 5,453,794 | 9/1995 | Ezaki . |
| 5,479,268 | 12/1995 | Young . |
| 5,481,542 | 1/1996 | Logston et al. .......................... 348/7 |
| 5,498,000 | 3/1996 | Cuneo . |
| 5,526,035 | 6/1996 | Lappington et al. . |
| 5,534,913 | 7/1996 | Majeti et al. ............................. 348/7 |
| 5,537,141 | 7/1996 | Harper et al. . |
| 5,539,471 | 7/1996 | Myhrvold et al. . |
| 5,543,849 | 8/1996 | Lang . |
| 5,553,221 | 9/1996 | Reimer et al. . |
| 5,564,073 | 10/1996 | Takahisa . |
| 5,570,295 | 10/1996 | Isenberg et al. . |
| 5,572,442 | 11/1996 | Schulhof et al. ................ 364/514 C |
| 5,585,858 | 12/1996 | Harper et al. . |
| 5,589,892 | 12/1996 | Knee et al. .......................... 348/731 |
| 5,604,542 | 2/1997 | Dedrick . |
| 5,612,730 | 3/1997 | Lewis ...................................... 348/8 |
| 5,633,918 | 5/1997 | Mankovitz . |
| 5,640,193 | 6/1997 | Wellner . |
| 5,643,088 | 7/1997 | Vaughn et al. . |
| 5,649,284 | 7/1997 | Yoshinobu . |
| 5,659,366 | 8/1997 | Kerman . |
| 5,668,592 | 9/1997 | Spaulding, II . |
| 5,677,708 | 10/1997 | Matthews, III et al. . |
| 5,686,954 | 11/1997 | Yoshinobu et al. ..................... 345/13 |
| 5,694,163 | 12/1997 | Harrison ................................ 348/13 |
| 5,696,905 | 12/1997 | Reimer et al. . |
| 5,724,091 | 3/1998 | Freeman et al. . |
| 5,724,103 | 3/1998 | Bathelor . |
| 5,729,252 | 3/1998 | Fraser . |
| 5,734,437 | 3/1998 | Back . |
| 5,761,602 | 6/1998 | Wagner et al. . |
| 5,761,606 | 6/1998 | Wolzien ............................... 455/6.2 |
| 5,774,664 | 6/1998 | Hidary et al. .................. 395/200.48 |
| 5,778,181 | 7/1998 | Hidary et al. .................. 395/200.48 |
| 5,793,365 | 8/1998 | Tang et al. ........................... 345/329 |
| 5,818,441 | 10/1998 | Throckmorton et al. . |
| 5,892,909 | 4/1999 | Grasso et al. ........................ 709/201 |
| 5,905,865 * | 5/1999 | Palmer et al. ........................ 455/3.1 |
| 5,912,700 | 6/1999 | Honey et al. . |
| 5,940,082 | 8/1999 | Brinegar et al. ..................... 345/442 |
| 6,018,768 | 1/2000 | Ullman et al. ....................... 709/218 |
| 6,122,658 | 9/2000 | Chaddha .............................. 709/203 |

OTHER PUBLICATIONS

"Internet TV Advertising," Dale Cripps: May, 8, 1998;http://web–star.com/hdtvnews/internettvadvertising.html; pp. 1–3.

"Gates TV, Interactivity," Dale Cripps, May 5, 1998;http://web–star.com/hdtvnews/gatestvinteractivity.html; pp. 1–4.

ICTV Brochure (a reproduced copy provided); copyright 1988 by ICTV; 27 pages.

"Microsoft Web TV" brochure, copyright 1998 by Web TV Networks, Inc.; 16 pages.

* cited by examiner

SOFTWARE DESIGN

ENHANCED VIDEO PROGRAMMING SYSTEM AND METHOD FOR INCORPORATING AND DISPLAYING RETRIEVED INTEGRATED INTERNET INFORMATION SEGMENTS

CROSS-REFERENCE TO RELATED APPLICATIONS

This application is a continuation of U.S. application Ser. No. 09/472,385 filed Dec. 23, 1999, which is a continuation of U.S. application Ser. No. 09/109,945 filed Jul. 6, 1998, now U.S. Pat. No. 6,018,768, which is a continuation-in-part of U.S. application Ser. No. 08/615,143 filed Mar. 14, 1996, now U.S. Pat. No. 5,778,181, which is a continuation-in-part of U.S. application Ser. No. 08/613,144 filed Mar. 8, 1996, abandoned, and is related to U.S. application Ser. No. 08/622,474 filed Mar. 25, 1996, now U.S. Pat. No. 5,774,664, which is herein incorporated by reference.

BACKGROUND OF THE INVENTION

Today, the capabilities of computers to provide massive amounts of educational and entertainment information has exploded with the Internet. The Internet has the power to transform society through unprecedented levels of information flow between members. Currently, on-line systems offer a variety of different services to users, including news feeds, electronic databases (either searchable by the user directly on the on-line system, or downloadable to the user's own computer), private message services, electronic newsletters, real time games for play by several users at the same time, and job placement services, to name a few. However, today, most on-line communications occur merely through text. This currently stands in great contrast to the audio/visual presentation of the alternative electronic medium, television. However, it is expected that as multi-media's incessant growth continues, audio/visual programs will proliferate and text will become less and less dominant in the on-line environment. Even though these programs will be introduced, the Internet, will remain essentially user unfriendly due to its very massiveness, organization, and randomness. Simply stated, there is no order or direction in the Internet. Specific pieces of information are many times hard to find, and harder yet, is the ability to put that piece of information into a meaningful context.

Television, on the other hand, has been criticized for being a passive medium-"chewing gum for the eyes," as Fred Allen once observed. Television has always been something you watched, not something you do. Many social critics believe that the passivity television depends on has seeped into our entire culture, turning a nation of citizens into a nation of viewers. While interactive television systems have increased the level of user interaction, and thus, provided greater learning and entertainment opportunities, vast information resources such as databases are inaccessible from such a medium.

What is needed is a means to close the gap between video programming and the information superhighway of the Internet. What is needed is a wider, richer experience integrating audio/visual and textual database elements into an organized unique interactive, educational, entertainment experience. Currently, the Internet is a repository of information on virtually any subject. However, what is needed is a mechanism for combining the userfriendly visual experience of television with the vast information resources of the Internet.

SUMMARY OF THE INVENTION

The system of the present invention combines broadcast television programming and/or video programming which appears on a VHS or Beta tape, CD-ROM, DVD or other medium, or video programming at a video server (hereinafter "video programming") with the massive Internet, creating a new and powerful educational and entertainment medium. The system allows consumers to receive more information in a more efficient manner than either television or the Internet alone. Consumers not only can see a news report on television, but they can also read pertinent information about the report, as well as explore related information about the story. The program becomes the introduction to a particular subject, rather than the entire subject itself. The act of viewing a program has now become a more engaging, enriching experience.

The system can also create a more intimate relationship between the viewer and the program. The user might be solving problems or performing virtual experiments on the Internet site that a teacher is discussing in an educational television program. Similarly, the consumer might be solving problems that the fictional characters in a television program must solve. In both cases, the consumer is an active participant in the process, rather than a passive observer.

Instead of an undirected and unfocused exploration of Internet sites, by synching specific Internet pages to the video signal, the system puts the Internet in context. The television program producers now can decide what additional information to offer their audience. This material can now be seen in the context of the television program.

An additional advantage is that consumers don't have to search through the literally hundreds of millions of pages on the Internet to find appropriate material. The material has already been filtered by the program producers and delivered to the consumer automatically.

Another advantage of the system is that it changes the nature of advertising. Since additional information can be given to consumers automatically, advertising can now be more substantive, allowing customers to make more informed choices. Now, the act of purchasing a product seen on television can be streamlined—the consumer can be given the choice of buying the product instantly using the two-way capabilities of the system.

In addition, users can take advantage of the two-way capabilities of the Internet to respond to polls, to send e-mail or to link to additional sites. For example, a viewer watching a television news program, through the system of the invention, can receive a stream of Web pages which provide additional, specific information relating to the news content—whether background on the Presidential primaries or the latest change in interest rates.

The video programming and corresponding Internet pages can be viewed on personal computers equipped with a television card, but the open software-based approach enables anyone with a television set and JAVA enables PC to experience the system of the invention.

By marrying the appeal of video with the two-way data transfer capabilities of the Internet, the system creates a powerful new medium: Video producers and Internet site creators can enhance their content to extend their brand identity and differentiate their program offerings to the millions of people who are spending more time navigating through the resources of the World Wide Web rather than watching television; advertisers can speak more directly to consumers by directly sending Web pages to the consumer instead of only displaying Web addresses in their commercials; and consumers can gain a new level of interest and interactivity over a video-based medium. In addition to providing significant and immediate benefits to broadcasters and advertisers, the system will also present educational programmers with a way to more effectively use Internet resources in the classroom.

Recently, several media companies have joined to create a system for linking the Internet and television on the personal computer, called "Intercast." In this system, content will be provided simultaneously with the TV video signal. This system, however, requires that stripped down Web pages be sent in the vertical blanking interval (VBI) of the video signal, using up to three scan lines limiting effective bandwidth to approximately 28.8 kbps. This approach, however, requires specialized hardware to both insert the Web pages into the VBI and extract these codes at each PC since it takes up to three scan lines of the VBI. Thus, the complexity and cost of the PC is increased. Because the Web pages are transmitted with the video signal, the Intercast system is not a true "two-way" system, but merely a one-way "piggyback" system. In addition, the Intercast is an analog video product, and thus, cannot handle digital video data.

The system of the present invention, on the other hand, is a much more flexible, but less complex, system. The present invention supports either analog or digital television broadcasts without broadcasters or end-users having to alter their existing systems, thus enabling broadcasters to reach a wide audience within a short time.

In a first embodiment, the actual Web pages are not forced into the very limited bandwidth of the vertical blanking interval (VBI). Instead, merely eight fields of line 21 of the VBI are used to deliver the relevant Internet Web page addresses to the PC. These addresses are called "uniform resource locators" (URLs). The system then directs the particular Web browser to retrieve the identified Web pages from the Internet. Upon receipt of the particular Web page(s), the system syncs the Web page(s) to the video signal, and at the appropriate times, presents the Web pages on one portion of the computer screen with the television video signal, shown in a window on another portion of the screen, and thus, provides the synergistic Internet and television experience. One of the advantages of the system of the present invention is that no specialized chip set need be produced and implemented into the standard PC. Thus, complexity is kept to a minimum.

In another preferred embodiment of the present invention, the VBI is not used to transmit the URLs to the user. In this alternative embodiment, member broadcasters enter the Internet through a member account, and will be provided with a graphical user interface for pre-scheduling Internet addresses, or URLs, for transmission to users at particular times of day. This interface could also be used to transmit real time live transmissions of URLs to users at the same time as a broadcast. The URLs are stored in a "Link File" for later transmission over the Internet to the user at the broadcasters entered time, which corresponds to the broadcast time of an associated program. The timing of URL's could be determined in advance or can be sent out live. This embodiment eliminates the need to place the URLs in the VBI, and also allows the broadcaster to store more than one Link File for transmission to users in different time zones, for example. Further, more than one broadcaster could access the same master schedule if desired, and add or delete certain URLs to personalize the program for their local audiences. Also, personalization can be taken to the single user, or small group of users, by having the system send a different stream of URLs to each user, depending on a unique user profile, for example. Thus, the personalization feature of the present invention allows each user to receive information uniquely relevant to their interests, demographics, history, etc. This embodiment makes the transmission of URLs to the user even less complex than the first embodiment disclosed herein.

Thus, it is an object of the present invention to provide order and direction to the Internet by using television signals to place, orient and control such information in a meaningful context.

It is an object of the present invention to create a more intimate relationship between the viewer and the program by enriching the learning experience through the provision of more in-depth information.

PREFERRED EMBODIMENT

Figure 1:
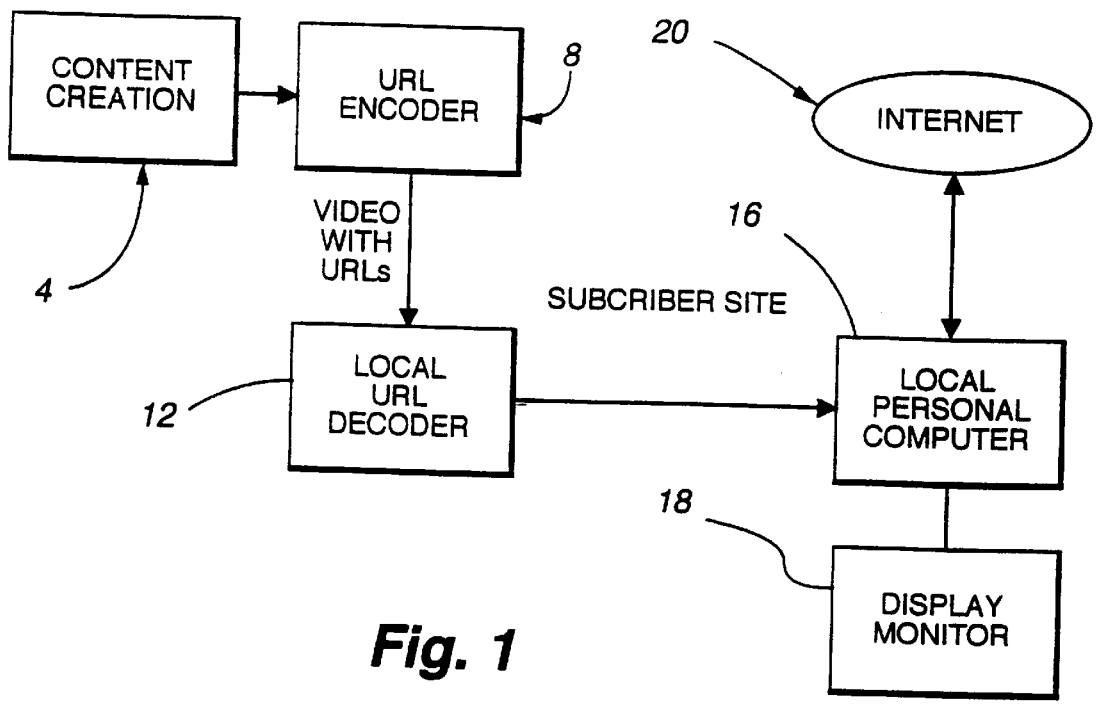
FIG. 1 is a diagram of the system design, showing the receipt and decoding of video signals at the subscriber location using the method of the present invention.

The system of the present invention combines the rich visual capabilities of video with the vast resources of the Internet. As shown in FIG. 1, a preferred embodiment of the invention is a computer based system for receiving a video program along with embedded uniform resource locators (URLs)—which direct the user's computer 16 to address locations, or Web sites, on the Internet 20 to retrieve related Web pages. These Web pages correspond to the video presentation. The particular video programming can be delivered in analog, digital or digitally compressed formats (e.g., MPEG2) via any transmission means, including satellite, cable, wire, television broadcast or sent via the Web.

The video programming is preferably created at a centralized location, i.e., content creation 4 as shown in FIG. 1, for distribution to subscribers in their homes, for example. Program creation is accomplished according to any conventional means known in the art. After a video program is created, uniform resource locators are embedded, in one preferred embodiment, into the vertical blank interval of the video programming by the URL encoder 8, shown in FIG. 1. In this embodiment, the URLs are encoded onto eight fields of line 21 of the VBI. Line 21 is the line associated with close captioning, among other things. However, the URLs could also be embedded in other fields of the VBI, in the horizontal portion of the video, as part of the audio channel, in any subcarrier to the video, or if digital, in one of the data fields.

Although FIG. 1 shows the video with URLs over the same transmission line, the URLs can be sent down independently of the video program on a data channel. In this embodiment, the URLs can be forwarded to the remote sites either prior to initiation or during the program. Preferably, the URLs have associated time stamps which indicate to the subscriber stations when, during the video program, to display the particular Web pages addressed by the URLs. Alternatively, the user can select when to call the particular Web pages for display with the video program.

The particular information in line 21 is not part of the visual part of the program, and thus, is not perceptible to the human eye, thereby making it ideal to send data information to the users. While the bandwidth capacity of line 21 is limited, because the system of the present invention transmits only the uniform resource locators (URLs), and not full Web pages, there is more than enough capacity. Furthermore, no additional hardware is necessary at the PC 16 to implement the elements of the present invention. Thus, the present invention has the additional advantages of being very efficient and takes advantage of conventional hardware.

Once the video program is created, it can be transmitted to user sites over any transmission means, including broadcast, cable, satellite, or Internet, and may reside on video servers. Furthermore, the video program, with or without embedded URLs, can be encoded on a VHS or Beta tape, DVD or other medium.

Preferably, each receiver station comprises any Intel x86 machine (preferably a 486 processor, pentium processor, etc.), an Apple Computer, UNIX or any other type of standard computer workstation. The local PC 16 is preferably connected to either a cable and/or broadcast television connection or to a local VCR or other video source. At each subscriber site, the local personal computer 16 preferably receives the cable transmission by cable connection on the back of the personal computer 16. The video/audio program can then be processed for display on the computer screen using any conventional PC card capable of displaying NTSC signals on a computer monitor, such as a WinTV card. In addition to the cable connection, however, in the present invention there is also an Internet 20 connection created concurrently with the cable connection.

The Internet 20 connection can be via high-speed line, RF, conventional modem or by way of two-way cable carrying the video programming. The local PC 16 has Internet access via any of the current ASCII software mechanisms. In a preferred embodiment, at each subscriber home, an associated local URL decoder 12 receives the cable video television program, as shown in FIG. 1. The local URL decoder 12 extracts the URLs, preferably embedded in the vertical blanking interval, with the use of any conventional VBI decoder device. The URL decoder 12 may be either a stand-alone unit or a card which is implemented into the personal computer 16.

Figure 2:
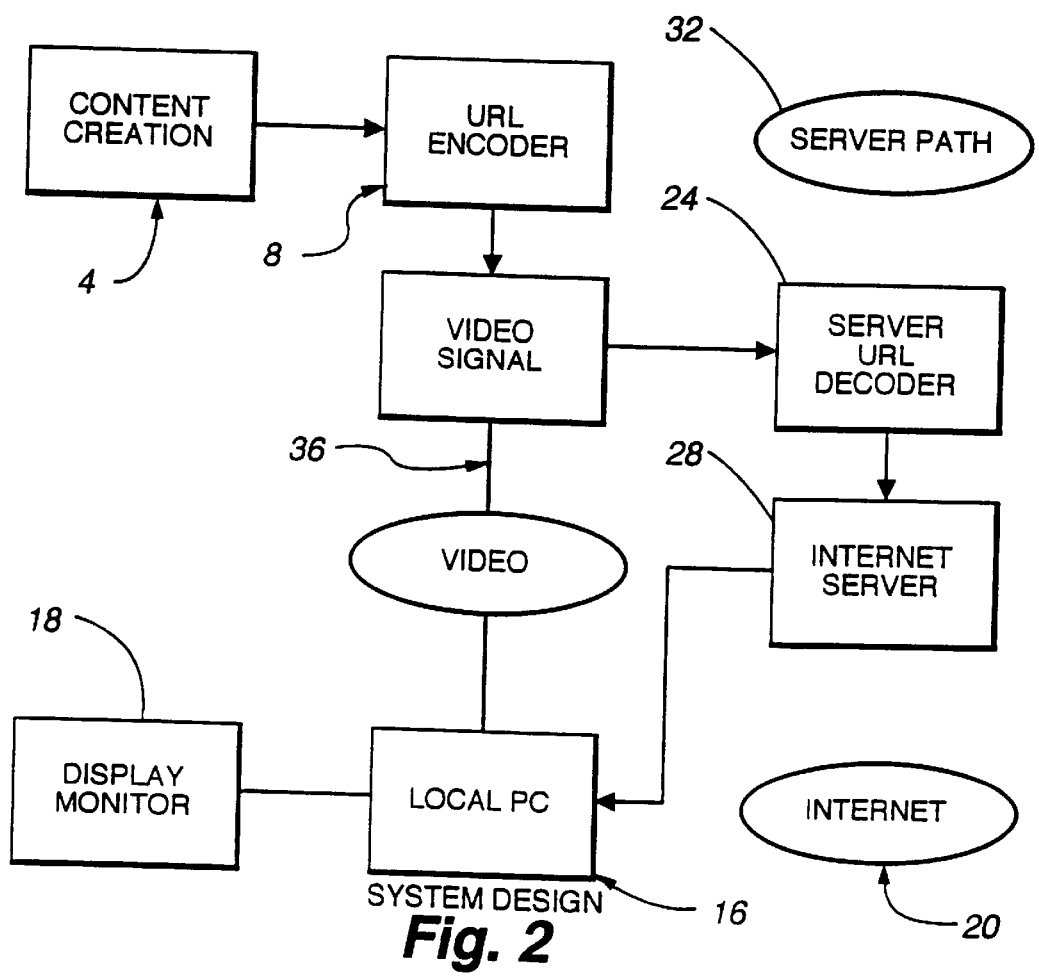
FIG. 2 is a diagram showing an alternative system embodiment to achieve the integration of the Internet information with the video content by decoding the uniform resource locators at a server site and then transmitting the URLs to the subscriber stations via the Internet.

In another preferred embodiment shown in FIG. 2, the uniform resource locators (URLs) are encoded into the video in the same manner as described above. Again, the URLs are preferably encoded onto eight fields of line 21 of the VBI, but may also be sent independently of the video. In this embodiment, the URL decoder 24 is located at the server site, as opposed to the subscriber location. When the decoder 24 receives the video program signal, it strips out the URL codes on line 21 of the VBI and delivers these codes independently to an Internet server 28. The URL code is then subsequently delivered over the Internet 20 to the user PC 16. Simultaneously, the video is broadcast over conventional broadcast or cable transmission means 36 to the user's personal computer 16.

Figure 4:
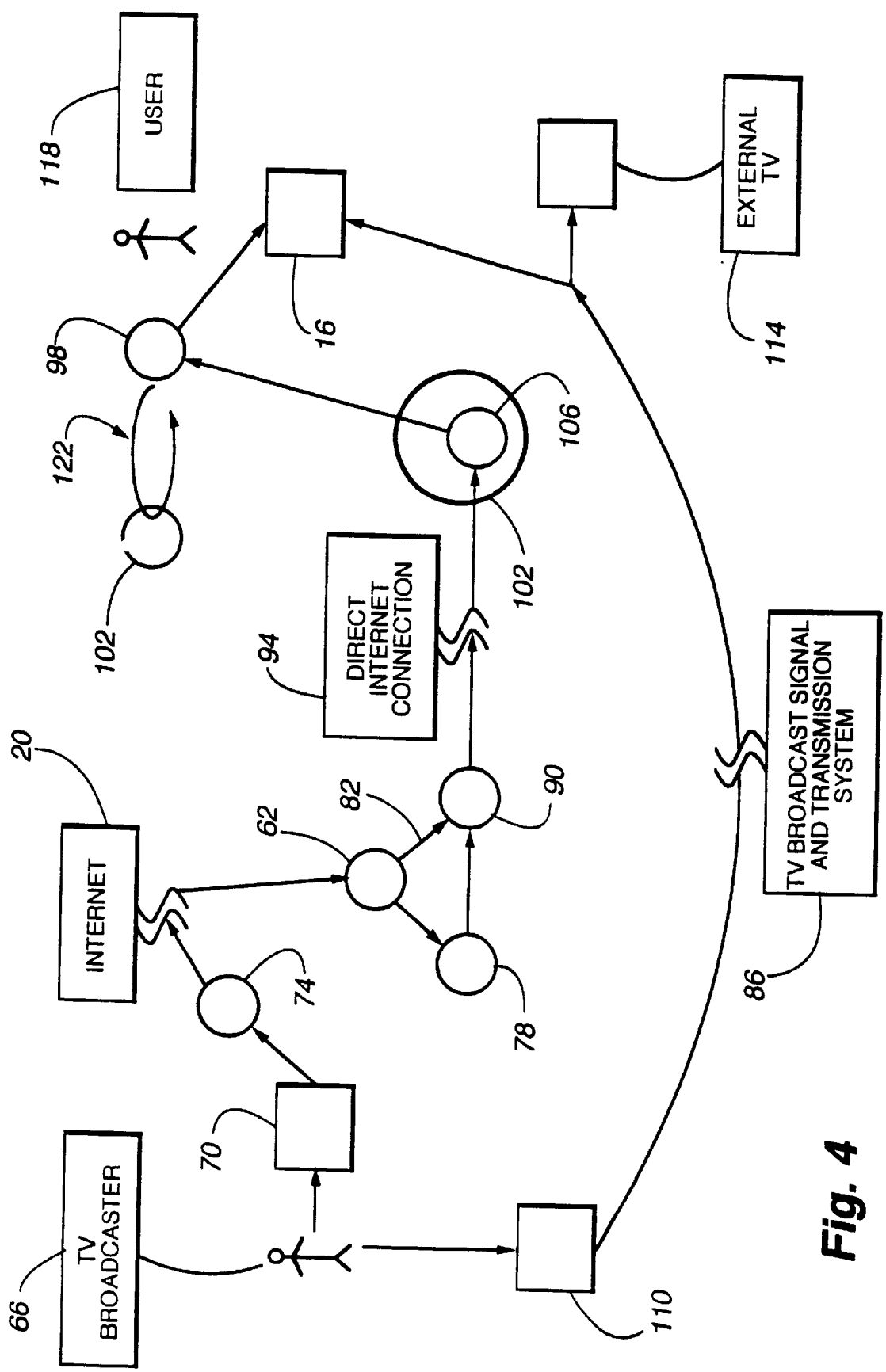
FIG. 4 is a diagram showing another preferred system embodiment to achieve the direct transmission of URLs over the Internet to the user at a broadcaster's entered time without encoding the URLs into the VBI.

Another preferred embodiment of the system, shown in FIG. 4, does not depend on, or even use, the VBI. In this preferred embodiment, the system will run an online service over the Internet 20. This service will be in the form of an Internet Web site 62 that provides a user-interface to a database 78 and to one or more associated data servers 90. The service will provide member-accounts to TV broadcasters 66 who sign up to use the system of the invention in conjunction with their broadcasts. Each member broadcaster will enter the service at their computer 70 through Web browser software 74 using their member account by entering various identification and password information. Once within their account, the member will be provided with a graphical user interface for pre-scheduling URLs for transmission to users 118 over a direct Internet connection 94 at particular times of day. The same user interface, or a variation on it, can be used by broadcasters for live transmission 82 of URLs to users at the same time as a broadcast 86.

For example, one example of this interface might be a scheduling calendar (daily, weekly, monthly, yearly) in which the broadcaster 66 may allocate time periods which coincide with their broadcasts 86, and during which they will send out URLs to their users to link to Web pages. For each time period (for example, a particular hour long period during the day) determined by the broadcaster 66 to be a broadcast period (a period during which they want to transmit URLs that correspond to a television show being broadcast from their TV broadcast facility 110 to the external TV 114 of the user 118 at that time), the broadcaster 66 may then enter a series of URLs into an associated file ("Link File") for transmission over the Internet 20 at that time. This Link File might have a user interface such as a spreadsheet, table, or list, or it could be simply a tab-delimited or paragraph-delimited text-file. As an to example, each of the records in the Link File consists of a data structure which could contain information such as:

(<timecode>,<URL>,<label or title>,<additional information>,<additional information>, . . . )

The above data structure is just one example. The records in the Link File preferably specify the time, Internet address (i.e. URL), label (such as an associated name), and some optional additional information, for each Web page the broadcaster 66 desires to launch during a show.

When a broadcaster 66 modifies their calendar and/or the Link File associated with any given time period(s) in their calendar, this information is saved into the database 78 that is attached to the site 62. Each broadcaster 66 may maintain multiple calendars in the database 78 if they broadcast in different time zones, for example.

The database 78 provides the Link File records for upcoming time periods to a server 90, which may be one server or a distributed network of server programs on multiple computers across the network, to be utilized for scaling to large national or global audiences. The server 90 provides the Link File records, including the URLs, to the user's personal computer 16, which is connected via a network. Examples of possible networks include the public Internet 94, a direct private network, or even a wireless network.

One feature of the above embodiment is that one or more broadcasters 66 may utilize the same schedule in the database 78 for their own broadcasts 86 or during the same broadcast. For example, a network broadcaster may develop a master schedule and various affiliate broadcasters may subscribe to that schedule or copy it (in the database) and add or delete specific URLs in the schedule for their local audiences or unique programming. This scheme enables affiliates to insert URLs for local advertisers or local subjects into a sequence of more general URLs provided by their network broadcaster 66. In other words, the affiliate can add links that ride on the network feed and then redistribute it to their local audiences.

The above embodiment can also enable personalization in the form of unique series of URLs specific to each user's unique profile, which is directly sent over the Internet 20 to each user's specific client software 106. This can be achieved from the broadcaster 66 to each individual user 118, or to particular collections of users. To accomplish personalization, the service may send a different stream of URLs to each user's client software program 106. The stream of URLs sent would depend on a user profile stored in the database 78 or the client software program 106, a user profile which is built on demand or over time for each user 118 based on criteria such as the location of the user, choices the user makes while using a client software program 106, or choices the broadcaster 66 makes during a broadcast 86, or automatic choices made by an algorithm (such as a filter) residing on the service 62. Personalization enables each user to receive URLs which are uniquely relevant to their interests, demographics, history, or behavior in the system.

System Operation

Once the URLs have reached the personal computer 16, system operation is similar for all of the embodiments diagramed in FIGS. 1, 2, and 4.

Figure 3:
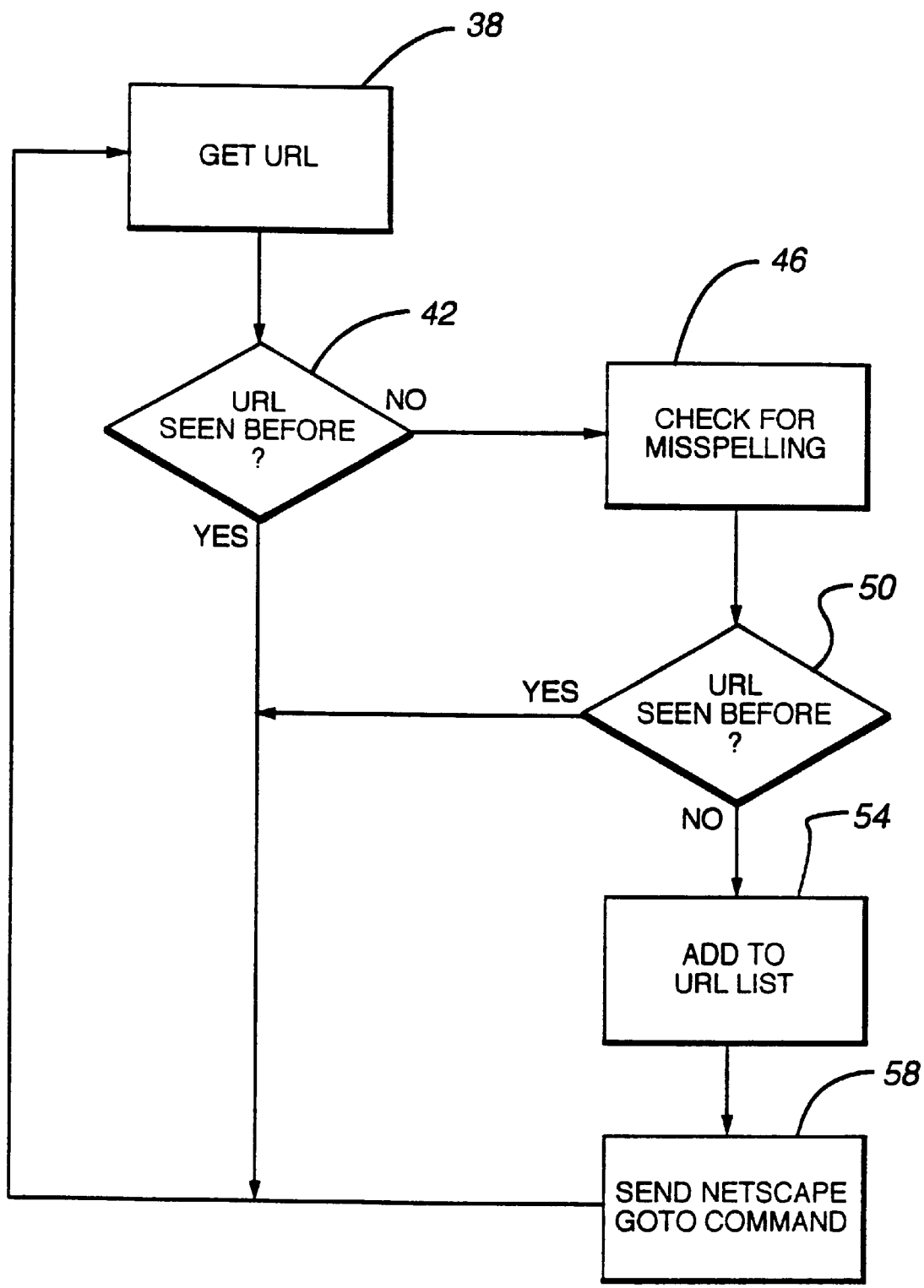
FIG. 3 is a flow diagram of the basic software design of the present invention.

In a preferred embodiment, a JAVA enabled browser 98 as well as specialized software 106 for performing part of the method of the present invention are installed on the computer 16. The JAVA enabled browser 98 allows the computer 16 to retrieve the Web pages 102 and is preferred software, since it is platform independent, and thus, enables efficient and flexible transfer of programs, images, etc., over the Internet 20. The specialized interface software 106 (hereinafter, "client software"), attached as Appendix A, acts as an interface between the video programming and the Internet functions of the present invention. The client software 106 retrieves URLs from the video program (embodiment of FIG. 1) or directly from the Internet connection (embodiments of FIGS. 2 and 4), interprets these URLs and directs the JAVA enabled browser 98 to retrieve the particular relevant Web pages 102, and synchronizes the retrieved Web pages to the video content for display on the user's computer 16, as shown in FIGS. 3 and 4 and explained in more detail below.

In a preferred method, the URLs are encoded and embedded into the video signal by inserting them into the vertical blanking interval (VBI), as mentioned above.

In another preferred embodiment, the URLs are entered by member TV broadcasters 66 along with specified times for transmitting the URLs to the user. At the appropriate times, the URLs are sent directly over the Internet to the user's PC 16 via the client software 106 over a direct point-to-point or multicasting connection.

One method of the present invention has the capability to detect identical URLs sent directly after one another which causes the browser not to fetch URLs in these particular cases. As shown in FIG. 3, once the URL code is received at the computer, the client software 106 first interprets the URL and determines in step 42 whether the particular URL has been received previously. If it has already been received, the next received URL is interpreted for determination of prior receipt. If the particular URL has not been detected before, the software checks for misspelling in step 46 and any other errors, and if errors exist, corrects these particular errors. Once again, it is determined whether the URL has been previously detected. If it has, the next URL is accessed in step 38. If the URL has not been detected, the specific URL is added to the URL list in step 54. The specific URL is then sent to the Web browser, preferably a JAVA enabled browser 98. Upon receipt of the URL, the browser 98, in step 58, will access the Web site address 122 (FIG. 4) indicated by the URL and retrieve the cited Web page(s) 102 via the Internet.

Viewers can view the integrated presentation in the following manner. As mentioned above, the video signal is processed and displayed on a video window on the PC screen using a WinTV card, for example. The corresponding audio is forwarded to the audio card and sent to the PC speakers.

The actual retrieved Web pages 102, referenced by the URL, are optionally time stamped to be displayed on the computer screen when predetermined related video content is displayed in the video window, thus, enlightening and enhancing the video presentation by providing in-depth information related to the video content thereto. Another section on the screen is also preferably used to represent an operational control panel. This control panel provides a list of the URLs that have been broadcast and correspondingly received by the computer 16. This control panel is updated to add a URL code each time a new URL code is received by the PC 16. This list gives the subscriber the flexibility to go back and retrieve particularly informative or interesting Web pages that have already been displayed earlier in the program, or alternatively, to print them out for future reference. Furthermore, the list could include URLs referring to Web pages not displayed with the broadcast program, but that provide further information on a certain topic of interest to the viewer.

The present invention can best be understood with reference to an example. A viewer can begin watching a musical video featuring a new band, for example. As the video is received by the PC 16, URLs are either being received with the video signal or are being received directly via the Internet 20 or another data channel, and are being interpreted by the client software 106. Upon direction and command, the JAVA enabled browser 98 retrieves particular Web pages 102 from Internet 20 Web sites identified in the URLs. These Web pages 102 will then be displayed on the video screen at particular times. Thus, for example, while the viewer is watching the music video, biographical information on the band can also be displayed adjacently to the video window. Web pages 102 could also include an upcoming concert schedule, or even audio clips of the band's music may be downloaded from the Internet 20. As another example, a user could be watching a program relating to financial news. While the narrator is shown discussing high tech stocks, Web pages corresponding to detailed financial performance information on high tech stocks, environment and characteristics can be displayed with the video on the computer screen. If the personalization features are included, Web pages associated with a particular user's stock can be fetched and displayed on the computer screen with the video program. When the program narrator switches to a discussion on the weekly performance of the Dow Jones, Web pages presenting related financial performance information can be simultaneously displayed. Thus, it is evident that the present invention profoundly enriches the viewing and learning experience.

It is understood that there can exist alternative embodiments for use with the present invention. For example, the user can view the interactive program using a television set 114 or other display monitor in conjunction with the display screen of the personal computer 16. In this embodiment, the relevant Web pages are shown on the personal computer 16 while the video program is displayed on the television monitor 114. In this alternative embodiment, a cable set top box receives the television program from the multichannel cable. The personal computer 16 also receives the video program from the multi-channel cable and extracts the URLs, embedded in the vertical blanking interval of the video signal or directly transmitted 94 over the Internet 20. The client software 106 extracts the URLs and retrieves the particular Web pages as described above. The Web pages are then synchronized with the particular video frames and presented to the user. It is understood that a hyperlink may exist on the Web site that will allow the user to automatically load the client software and call up the specific television channel referenced in the Web site. For example, someone browsing the Internet 20 may come upon a major television network's Web site. They scroll to an interesting story then click on an hyperlink to turn on the software which tunes the TV window to the network to enhance the information residing at the Web site.

Furthermore, instead of receiving the video program from a transmission means, the video program can be addressed directly from the user site if the video program, with or without embedded URLs, is stored on a VHS, Beta, DVD or other medium. In this embodiment, the user PC 16 and/or television 114 are connected to a VCR, DVD player or other appropriate device.

Figure 5:
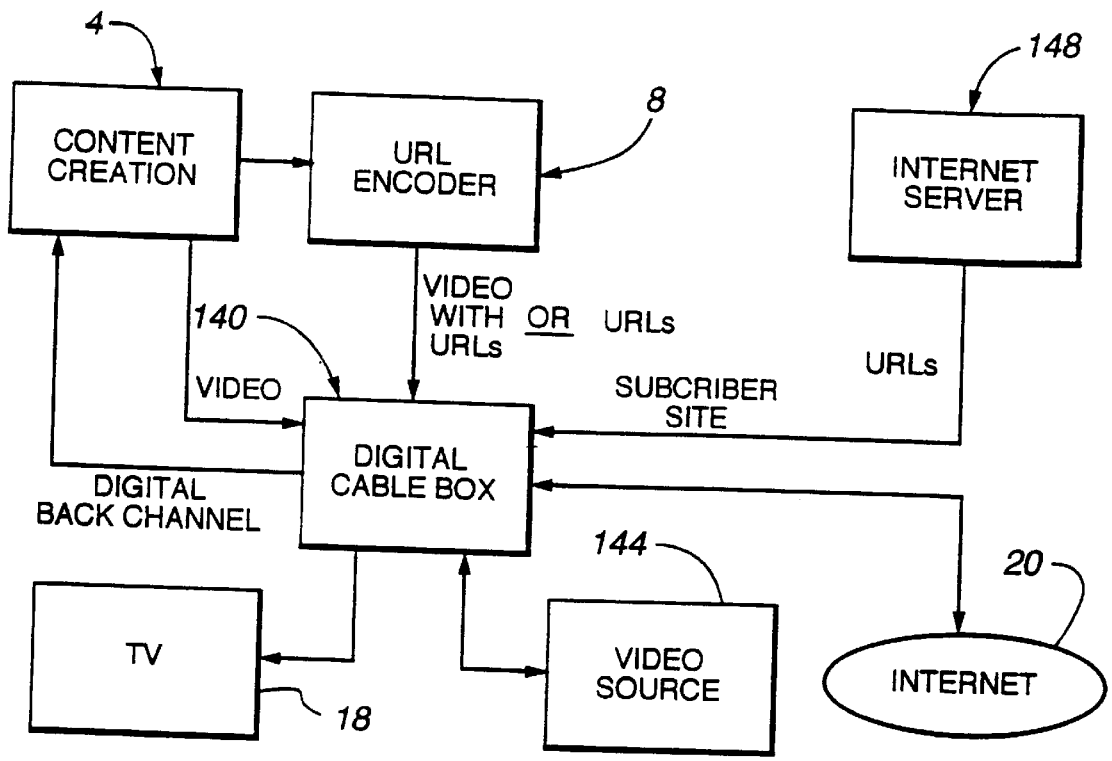
FIG. 5 is a diagram of another preferred embodiment including a digital cable box.
Figure 6:
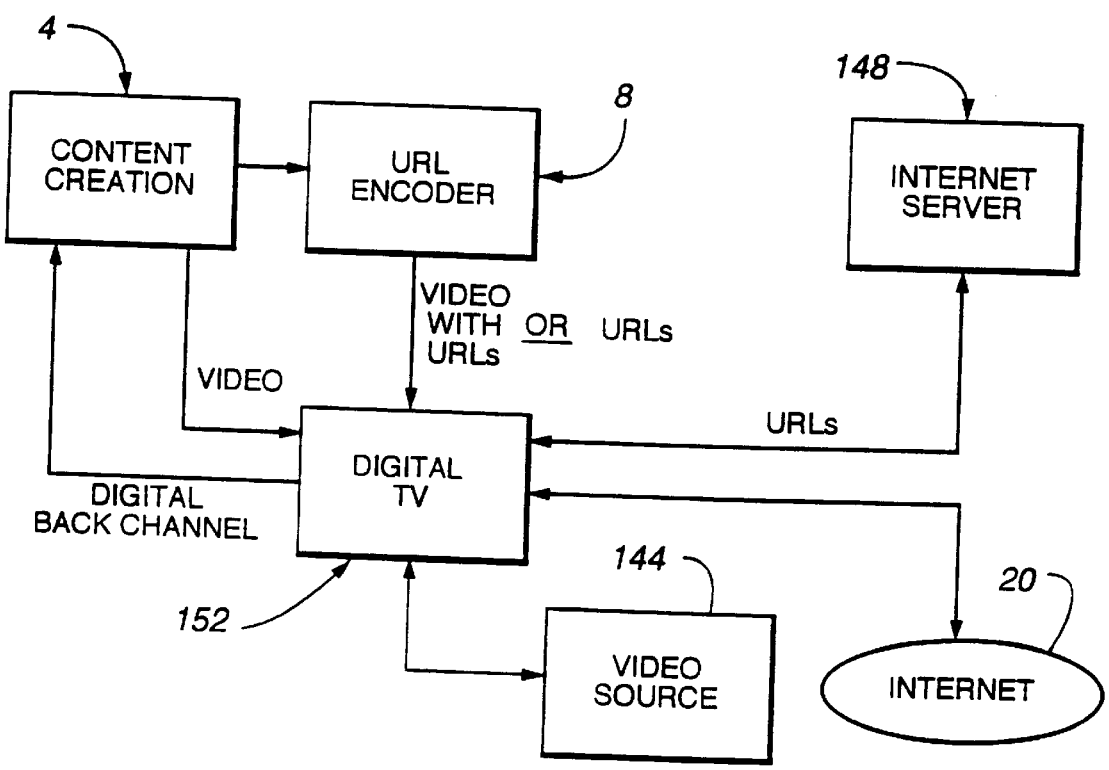
FIG. 6 is a diagram of another preferred embodiment including a digital T.V.

FIGS. 5 and 6 show two alternative embodiments for use with the present invention. For example, the user can view the interactive program using a television set 18 or other display monitor in conjunction with a digital cable box 140, as shown in FIG. 5. In this embodiment, the digital cable box 140 performs the functions of the personal computer 16 shown in FIGS. 1, 2 and 4. In the embodiment shown in FIG. 5, the client software is stored in memory in the digital cable box 140. In the preferred embodiment, the digital cable box 140 includes two tuners, thus allowing both the Web Page and the Video program to be simultaneously viewed on the same screen. If Video and Webstream, however, are carried on one channel, then only one timer is necessary.

The client software retrieves URLs from the received video program, directly from the Internet connection 20 or via a separate data channel, interprets these URLs and directs the Web enabled browser to retrieve the particular relevant Web pages, and synchronizes the retrieved Web pages to the video content for display on the television 18, as shown in FIG. 5. In this embodiment, the relevant Web pages are shown in one frame of the television 18 while the video program is displayed in another frame.

In this alternative embodiment, the digital cable set top box 140 receives the television program from the multichannel cable. The URLs can be encoded into the digital program channel using MPEG1, MPEG2, MPEG4, MPEG7 or any other compression video scheme. Alternatively, the URLs can be transmitted to the digital cable boxes 140 from an Internet server 148. The digital cable box 140 decodes the URLs from the digital video signal or directly transmitted over the Internet 20. The client software decodes the URLs and retrieves the particular Web pages as described above. The Web pages are then preferably synchronized with the particular video frames and presented to the user.

As with all the embodiments described above, instead of receiving the video program from a transmission means, the video program can be addressed directly from a local video source 144 if the video program, with or without embedded URLs, is stored on a VHS, Beta, DVD or other medium. In this embodiment, the digital cable box 140 is connected to a VCR, DVD player or other appropriate device.

FIG. 6 discloses an embodiment where a digital TV 152 is the remote reception unit.

In this embodiment, the digital TV 152 performs the functions of the personal computer, shown in FIGS. 1, 2 and 4, and the digital cable box 140 shown in FIG. 5. In the embodiment shown in FIG. 6, a processor means and memory are incorporated into the digital TV 152. Further, the client software and Web browser software are implemented into memory in the digital TV 152. All of the functions described above with reference to the other embodiments are performed in a similar manner by the digital TV 152 embodiment.

Although the digital cable box/TV 140, 18 and digital TV 152, shown in FIGS. 5 and 6, are incorporated into the embodiment of FIG. 1, in substitution for the PC 16, they also could be substituted for the PC 16 shown in FIGS. 2 and 4.

The user can view the video and web content on one screen (in two windows), or with the video on one display screen and the Web content on a separate display monitor. Alternatively, the user can access the video or web content separately. Thus, the user can branch from video to web content and vice versa.

Figure 7:
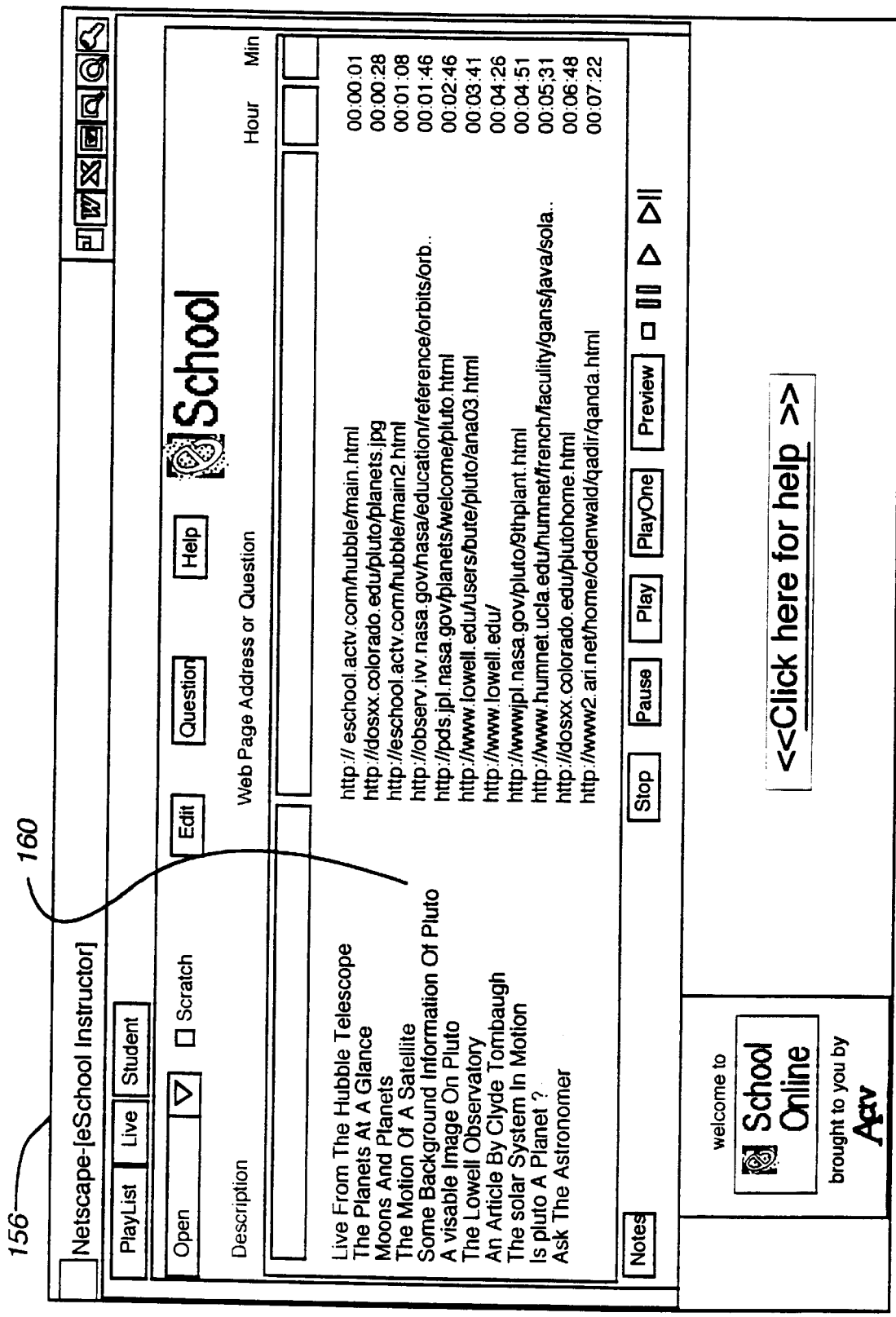
FIGS. 7 & 8 are sample displays provided to a student of a lesson.

The present invention is well-suited to the education environment. In this embodiment, students and teachers access one or more Web servers. The software components include instructor and student user software, authoring software and database assessment software. In one such embodiment, an instructor uses content creation software on a personal computer to easily integrate into their curriculum current information published on the Web, through an easy to use interface 156 such as that shown in FIG. 7. The instructor creates a playlist (i.e. linkfile) 160, the playlist 160 comprising a listing of Web pages, text notes and questions. The Web sites and questions are set forth in a predetermined order and can be assigned times. Preferably, the URLs identifying the Web site and time stamps are sent automatically to the desktop of each student in the virtual community, either during playback of a pre-recorded program or during a live event.

At each of the student workstations, the program is directed by the playlist 160. In other words, the playlist 160 provides the structure for the program. At predetermined times as dictated by the playlist 160, the browser will go fetch and display a Web page in a frame on the computer screen. Because program events can be set up in this manner at predetermined times, the entire program and playlist can be prerecorded and stored in a Web database for later access by students.

A significant advantage of the present invention for educational applications is that the students and the instructor can be located anywhere, as long as they are all connected to the Web. Because a server is essentially controlling the program, the instructor output comes from the server and the student workstations get automatically updated by the Web server.

Figure 8:
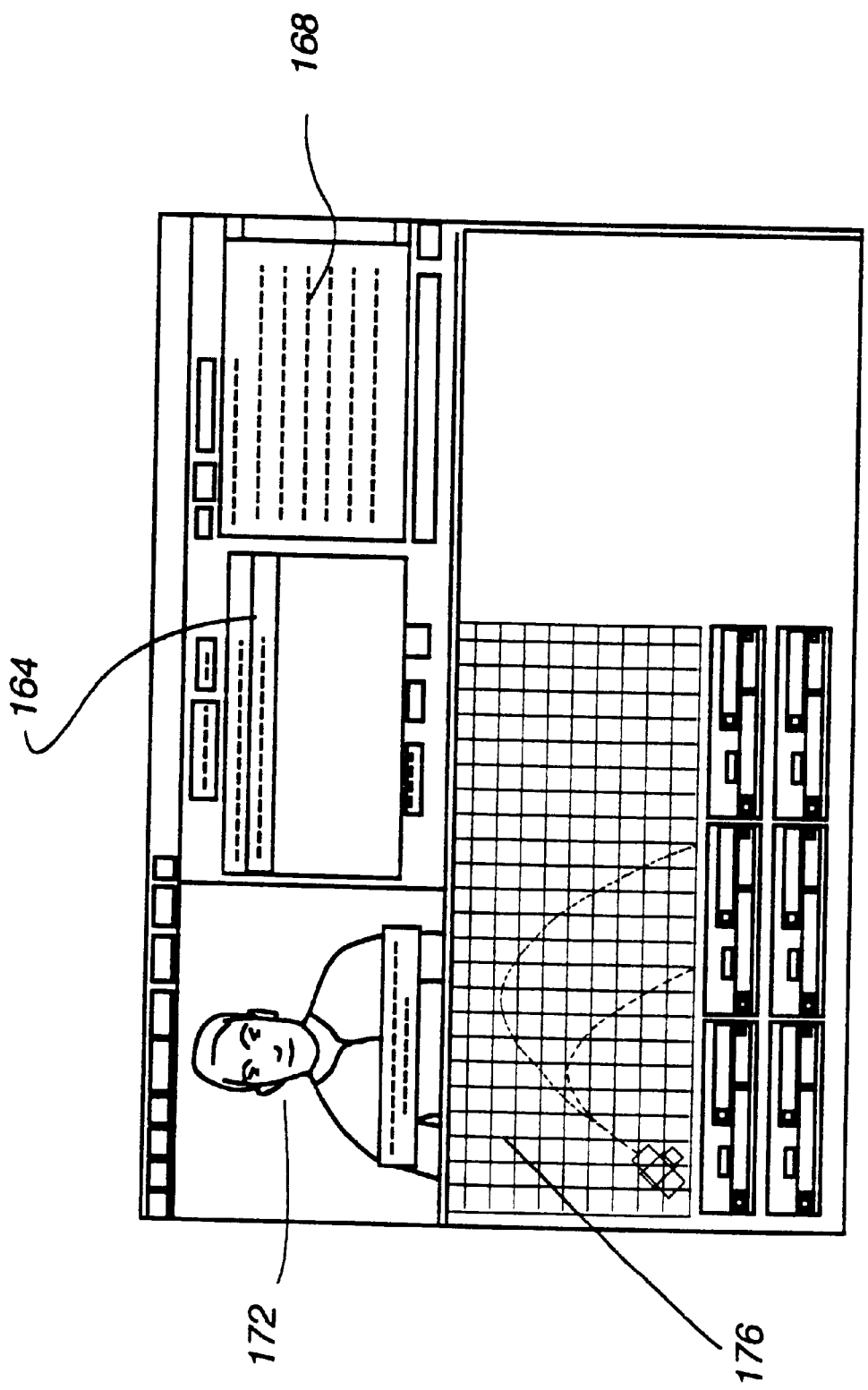

This educational embodiment integrates Web content and other media with collaborative groupware functionality to create an interactive environment for students and teachers. In this embodiment, the student can receive a traditional video lesson through a frame in his or her Web browser, or from a television. Simultaneously, the present invention provides separate frames, an example of which is shown in FIG. 8, in the browser displaying: (1) Web pages 176 automatically delivered to each student's desktop with information or exercises that complement the video presentation; (2) a chat dialogue frame 168 for conversing with the instructor and/or other students online; and (3), an interactive playlist 164 of Web pages and questions comprising the lesson.

In the student interface of FIG. 8, each student can perform a virtual experiment during a physics lesson to learn about gravity, for example. Further, the students are conversing with one another and the instructor in the chat dialogue frame 168. They may also send Web pages to one another and provide answers to questions from the teacher via the chat dialogue frame 168 of the student interface 176. With the chat feature, students may break into subgroups for collaborative learning. Whenever a student in the group sends a message, the message is sent to the Internet server 20 and every other student in the subgroup receives and views the message in their Chat dialogue frame 168.

The instructor, however, may retain control over the chat feature. For example, the instructor can terminate the chat feature or web pushing to terminate unruly on-line conversations or the sending of Web pages by students.

Unlike conventional distance learning systems, the present invention is more powerful by allowing the instructor to freely and conveniently exercise almost any time of testing strategy. The instructor can test students using a combination of the Chat dialogue feature and Web pages. For example, multiple choice questions and short answer questions can appear in the Chat window 168. Essay questions, requiring longer answers, become Web pages. As mentioned above, students can perform virtual experiments on-line. Once the instructor's personal computer receives student answers, student scoring can be presented to the instructor in any format including tables, charts, diagrams, bar graphs, etc. The instructor, thus, can analyze the results and has the capability of providing real-time feedback to the students.

Students can also receive individualized feedback via branched interactive audio, video and/or graphics responses. For example, the workstation may branch to a particular audio response, preferably prerecorded in the instructor's own voice, based on the student response to a multiple choice question. In this embodiment, a plurality of potential audio responses are made available at the student's workstation according to any one of the methodologies set forth in U.S. Pat. No. 5,537,141, entitled DISTANCE LEARNING SYSTEM, herein incorporated by reference. Alternatively, personalized video, audio and graphics segments can be delivered and displayed to the student based on a student answer or personal profile in the manner set forth in U.S. Pat. No. 5,724,091, entitled COMPRESSED DIGITAL DATA INTERACTIVE PROGRAM SYSTEM, herein incorporated by reference.

Responses to student answers can be more substantive based on the memory feature of the present invention. The memory feature is an algorithm that selects an interactive response to the user based not only on the student's current answer selection, but also his or her previous responses, as discussed in the aforementioned applications. The algorithm, preferably stored in memory at each student's workstation and under processor control, merely selects an output interactive response based on student responses. As another example, if a student gets three answers in sequence right, he or she receives a more difficult question. If, however, the student misses one or more of the three questions, he or she receives an easier question.

Figure 9:
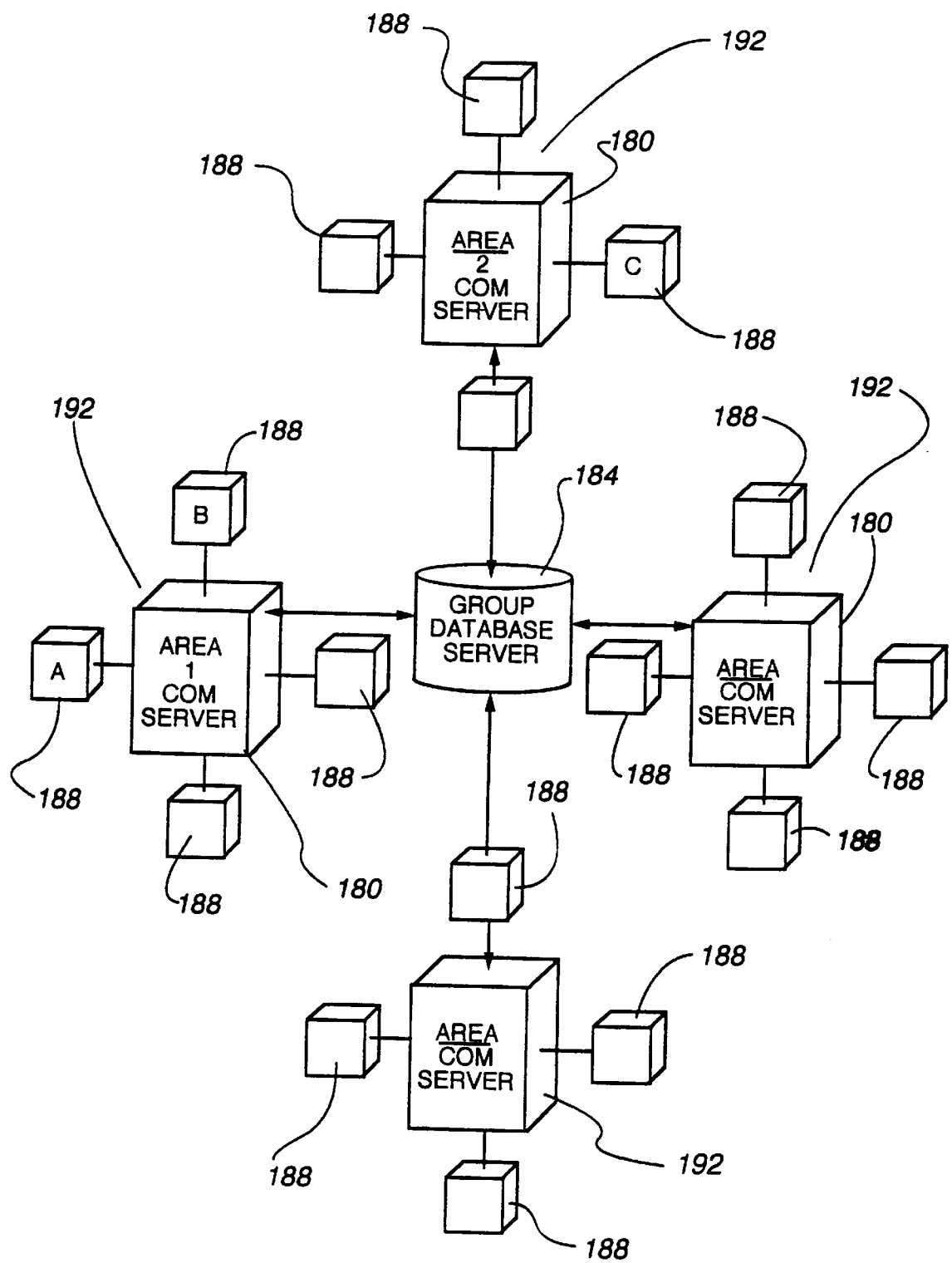
FIG. 9 is a diagram of the distributed Coma Server embodiment.

In another embodiment of the present invention, a system is described capable of handling the education requirements of several schools in an efficiently designed network. The system shown in FIG. 9 solves the problems inherent in attempting to service large numbers of users, the most obvious obstacles being the issues of load and performance. In this embodiment shown in FIG. 9, communications servers 180 distribute and route messages across a LAN, WAN and the Internet. Referring to FIG. 9, in the center of the diagram is the Group Database server. Surrounding the database server are several Com Servers 180, each serving an area 192. Surrounding each Com Server 180 are squares representing user stations 188. The Communication Servers 180 are organized in node relationships with one another.

Each node is responsible for serving an Area 192. An Area 192 is defined as a Virtual location serviced by a single Communications Server 180 (or "Com Server"). An Area 192 may be a single school, an office, or may consist of several actual physical locations. The defining characteristic of an Area 192 is that messages sent from one member of an Area 192 to another need not be routed outside of the servicing Corn Server 180.

An Area member is analogous to the frequently used term "user." For example, a "user" may be a student in the educational embodiment described above with reference to FIGS. 7 and 8.

The Distributed Communication System of FIG. 9 shall permit the dynamic addition of Communication Servers 180 within a group with little or no administrative tasks as well as the addition of groups within an overall communications network. A Communication Server group consists of several defined Virtual Areas 192 (preferably, consisting of no more the 250 members each), each area 192 serviced by a single Corn Server 180. This system shall allow members of one Area 192, or group to easily communicate with members of another Area 192 or group without any configuration changes.

Generally, service of very large numbers of users has required large expensive servers and networks. As the user base increases, performance suffers and hardware must be upgraded to service the demand.

The Distributed Communication System of the present invention allows the same, relatively inexpensive machines to serve an ever-increasing user base. The technique by which this will be accomplished will be through the routing of messages from one server to another when necessary.

The method essentially follows the same core pattern as IP routing and DNS lookups. If a message is for a member not belonging to the current Area 192 or group, the message shall be routed through the Distributed Communication System until its destination, or someone who knows the destination and can deliver the message, is found.

The destination will be cached so subsequent-messages for that member or group may be more efficiently delivered.

Referring again to FIG. 9, if a message is posted by member "A" and is intended only for the members of group 1 the message shall never leave Area 1 Com Server. However, if the message is intended for members of Area 1 and the members of Area 2, the Area 1 Com server forwards the message to the group database server 184. The message shall be broadcast to the members of Area 1 and tagged in the database 184 as belonging to Area 2. The message is then routed to Area 2 and broadcast to Area 2 members. With this technique any member can potentially send a message to any other member. If the Area Com server 180 does not recognize the destination, the message is forwarded up the line. Each Com server 180 does not need to know about any other server 180. Messages are routed until they delivered. If undeliverable, the original sender is notified.

New Areas 192 can be added on the fly. When a new Com server 188 is added to the network, it registers itself with the database application. Henceforth, any message destined for the new Area 192 can be routed properly without altering the other Area Servers 180.

If This method and system works for global messages or for user to user messages. Furthermore, new Groups may also be dynamically added. Once added, each new Group Database Server 184 registers itself with the existing database servers 184. This distribution of load permits nearly unlimited expansion with existing software and hardware. Each server manages a finite number of members, cumulatively serving a growing community.

Users need not be informed as to the particular Com Server 180 they should connect to. Members are directed to a single URL. The selection of the server for user connection is determined by load balancing software. In this manner, the network may appear to be a global network of Servers or simply a local classroom.

The unique aspects of this architecture, using database servers as routing gateways, using techniques resembling IP routing and DNS lookup, enables this system to serve with minimum administration and configuration and with lower end, cost-effective hardware.

Using the foregoing embodiments, methods and processes, the system of the present invention creates a synergistic experience combining the vast resources of the Internet with the presentation capabilities of television.

We claim:

1. A method for determining whether an address, identifying a source of an online information segment, has been previously received, the method comprising the steps of:

receiving a programming signal;

receiving the address identifying the source of the online information segment;

reviewing a list of previously received addresses;

determining whether the address is on the list of previously received addresses;

retrieving the online information segment from the source when the address is not on the list; and adding the address to the list upon initial retrieval of the online information segment from the source.

2. A method as described in claim 1, wherein the address is embedded within the programming signal and the method further comprises the step of extracting the address from the programming signal.

3. A method as described in claim 1, wherein the list is deleted every time a system implementing the method is restarted.

4. A method as described in claim 1, further comprising the step of saving the list in a storage device.

5. A method as described in claim 4, wherein the storage device is local to a system receiving the address.

6. A method as described in claim 4, wherein the storage device is remote to a system receiving the address.

7. A method as described in claim 4, wherein the storage device further comprises at least one storage device selected from the group consisting of: magnetic tape, compact disc, digital versatile disc, server, computer hard drive, random access memory, read only memory, CD ROM, a magnetic data storage medium, and an optical data storage medium.

8. A method as described in claim 1, wherein the list further contains a designator of when a listed address was last updated, and the method further comprises the step of determining whether the online information segment provided by the source has been modified since the listed address was last updated.

9. A method as described in claim 8, further comprising the step of verifying whether the address has been updated on a locally generated list.

* * * * *